July 13, 1948.  J. W. DRAKE  2,444,923
SYNCHRONIZING CONTROL
Filed June 21, 1946  2 Sheets-Sheet 1

INVENTOR
James W. Drake
By Carlson, Pitzner, Hurd & Wolfe
ATTORNEYS

July 13, 1948.  J. W. DRAKE  2,444,923
SYNCHRONIZING CONTROL

Filed June 21, 1946  2 Sheets-Sheet 2

INVENTOR
James W. Drake
By Carlson, Pitzner, Hubbard & Wolfe
ATTORNEYS

Patented July 13, 1948

2,444,923

UNITED STATES PATENT OFFICE 2,444,923

SYNCHRONIZING CONTROL

James W. Drake, Rockford, Ill., assignor to Woodward Governor Company, Rockford, Ill., a corporation of Illinois Application June 21, 1946, Serial No. 678,213

11 Claims. (Cl. 318—450)

1

This invention relates to a mechanism for automatically synchronizing the rotary speeds of one or more power driven slave units, such as the prime movers of a multiengine aircraft, with that of a master power unit the speed of which, as well as that of the slave units, may be adjusted under manual control.

One object is to provide a synchronizing control having a novel means for limiting the range of speed adjustment thereby so as to avoid wide variation in the speed of any slave unit following a failure of the master unit.

Another object is to provide for centering of the range limiting means during each manual adjustment of the speed settings of the power units.

The invention also resides in the novel construction and arrangement of the range limiting means and the manner in which it is rendered operative and inoperative selectively.

Other objects and advantages of the invention will become apparent from the following detailed description taken in connection with the accompanying drawings, in which Figure 1 is a schematic view and wiring diagram of a plurality of power units adapted to be synchronized in accordance with the present invention.

Figure 1:
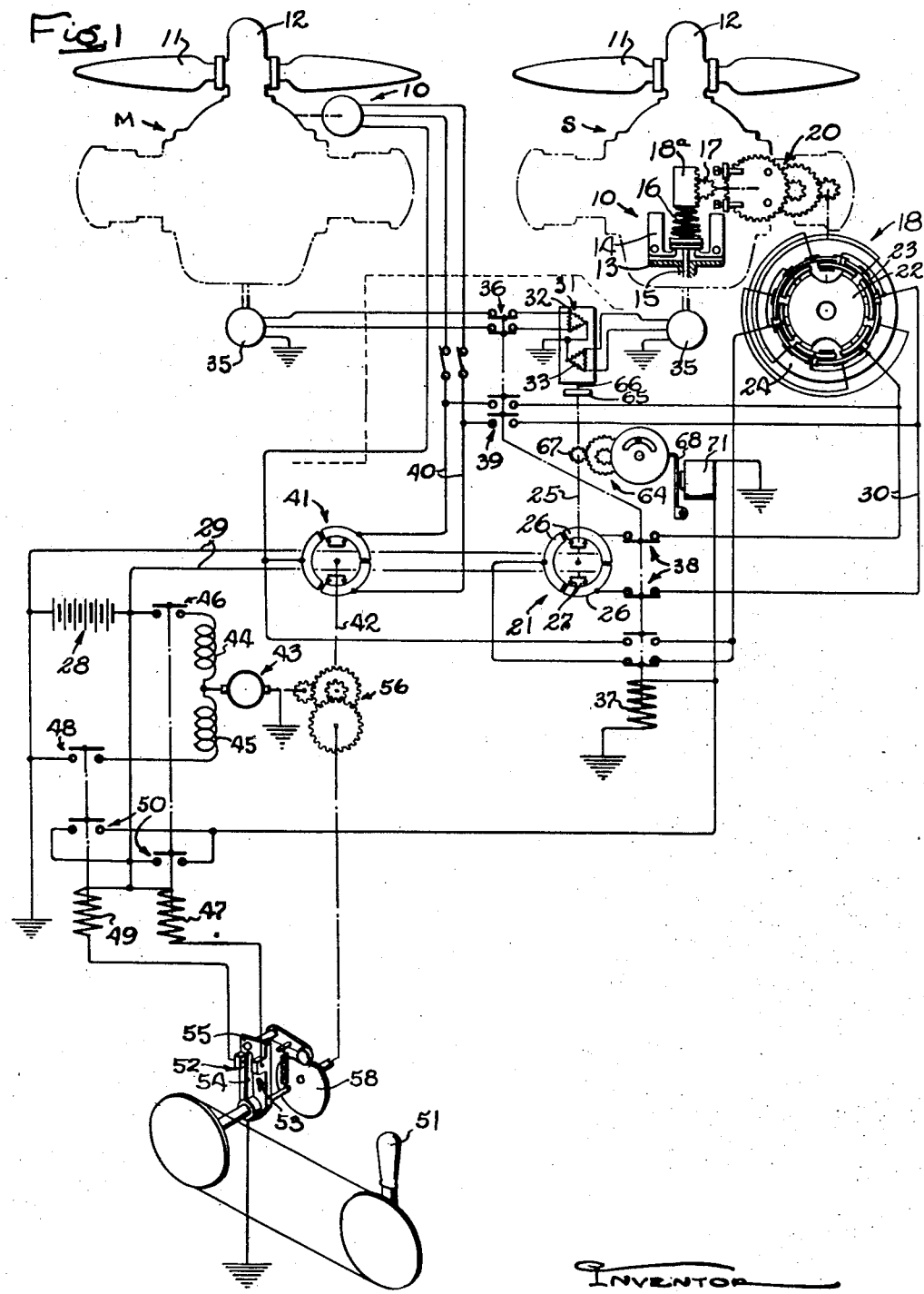

In the drawings, the invention is shown for purposes of illustration incorporated in a system for manually adjusting the speeds of a plurality of internal combustion engines and automatically synchronizing the speed of one or more engines S with that of a master engine M. Herein, the speeds of the power units are controlled by individual governors 10 which, in the case of aircraft engines, effect a speed regulation by adjusting the pitch of propellers 11 driven by the engines. This may be accomplished by applying hydraulic pressure controlled by the governor to a servomotor 12 for turning the propeller blades on their longitudinal axes. The governor 10 on each slave and master engine includes a head 13 driven by the engine and pivotally supporting flyballs 14 which are connected to a rod 15 urged downwardly by an adjustable speeder spring 16 and actuating a valve that regulates the flow of pressure fluid to and from the servo 12. Thus, the governor operates automatically in a known

2 manner to vary the propeller pitch and maintain the speed of the engine at a constant value determined by the adjustment of the speeder spring 16. Such adjustment may be effected by turning a pinion 17 meshing with a rack on a movable abutment 18ª engaging the spring.

To enable the speed setting of each slave engine to be adjusted from a remote point of control, the pinion 17 is adapted to be turned by an electric motor 18 mounted on the governor casing and acting through speed reduction gearing 20. This motor is the receiver of a self-synchronous electrical system controllable from a transmitter 21 located at a remote point of control, the pilot's cabin in the case of an airplane. Herein, the electrical receiver 18 is of the step motor type having a permanently magnetized rotor 22 adapted to occupy any one of twelve well defined angular positions according to the combination of direct current potentials applied to three sets of distributed windings 23 on the motor stator 24. When these windings are deenergized, the rotor will come to an abrupt stop and be held magnetically.

Operation of the step motor in one direction or the other is effected by turning the shaft of the transmitter 21 which is a commutator switch herein shown as comprising angularly spaced segments 26 engaged by contacts 27 which are arranged in pairs respectively connected to the different polar terminals of a battery 28 through conductors 29. The segments 26 are connected directly to the windings of the step motor 18 through a ground and conductors 30. The construction of the step motor is such that as the switch shaft 25 turns in one direction, the windings of the step motor will be energized in successive combinations causing the rotor 22 to follow the movements of the switch shaft. Reverse operation of the motor takes place when the rotor of the commutator switch 21 is turned in the opposite direction.

The speed of each slave engine S is compared with that of the master engine M, and any difference is utilized to turn the corresponding commutator switch 21 in a corresponding direction and by an amount such as to correct for the speed deviation. Such speed matching is effected by a differential motor or so-called differential Selsyn 31 comprising a three phase two pole stator and a three phase two pole rotor having windings 32 and 33, the rotor being fast on the shaft 25. The windings 32 and 33 are energized by small permanent magnet generators represented diagrammatically at 35 and respectively mounted on the engines M and S and driven thereby. The connections from the generator 35 of the master engine include switches 36.

With both windings of the differential motor energized and with the engines M and S running at the same speed, the frequencies of the two current sources will be identical so that the shaft of the differential motor will not turn, and, therefore, the commutator switch 21 will be idle. When the speeds of the master and slave engines are different, the frequencies of the current supplied by the respective generators will differ proportionately, and the rotor of the differential motor will turn in a direction determined by which frequency is higher. Such operation of the motor and the commutator switch driven thereby will continue until the slave engine has, by operation of the step motor 18 and the speed correcting means associated therewith, been brought into synchronism with the speed of the master engine M.

To enable the differential motor 31 to be disabled at certain times, as during the adjustment of the engine speeds under manual control, the switches 36 are connected to the armature of a magnetic relay 37. When the latter is energized, the switches 36 will be opened, and such energization also results in opening of switches 38 thereby disconnecting the transmitter 21 from the receiving motor 18 of the slave engine S. At the same time, switches 39 are closed to complete an electrical connection between the motor 18 and conductors 40 leading from an auxiliary commutator switch 41 to the step motor of the governor on the master engine M.

For the purpose of adjusting the speed settings of all of the governors 10 under manual control from the remote point, the shaft 42 of the transmitter or commutator switch 41 is connected through speed reduction gearing to the shaft of a reversible motor 43 which runs in one direction or the other according to which of its windings 44 or 45 is energized from the battery 28. The circuit for the winding 44 is closed by a switch 46 when a relay 47 is energized, while the winding 45 is energized by closure of a switch 48 when a relay 49 is energized. When either one of two switches 50 is closed, a circuit is completed for energizing the relay 37, thereby disconnecting the commutator switch 21 from the step motor 18 and connecting the step motor of all of the power units to the commutator switch 41. The speed adjusting motor 43 is started in one direction or the other by movement of a manually operable lever 51 to a position corresponding to a newly selected speed setting where the lever is retained as by friction. Such movement turns a contact arm 54 to close a corresponding one of two switches 52, 53 and correspondingly turn an arm 55 carrying the insulated contacts of these switches. The corresponding one of the relays 47, 49 is thus energized, and the motor 43 is started and continues to run in the proper direction until a follow-up mechanism including speed reduction gearing 56 and a heart-shaped cam 58 allows the arm 55 to move and open the then closed control switch, whereupon the motor 43 will be stopped automatically. By correlating the gear train 20 and the gear train 56 between the motor 43 and the cam 58, the range of motion of the hand lever 51 will correspond to the range of speed adjustment of the governors 10 so that the latter will, after each change in the setting of the lever 51, be adjusted by its motor actuator for the maintenance of a corresponding engine speed.

In response to deenergization of both of the relays 47 and 49 as the governors become adjusted to the new speed, the switches 50 will again be opened. This results in deenergization of the relay 37 thereby disconnecting the step motors from the adjusting commutator switch 41 and placing only the slave motors 18 under the control of the synchronizing commutator switch 21. Manual control is thus withdrawn and the synchronizing control is restored automatically.

Figure 2:
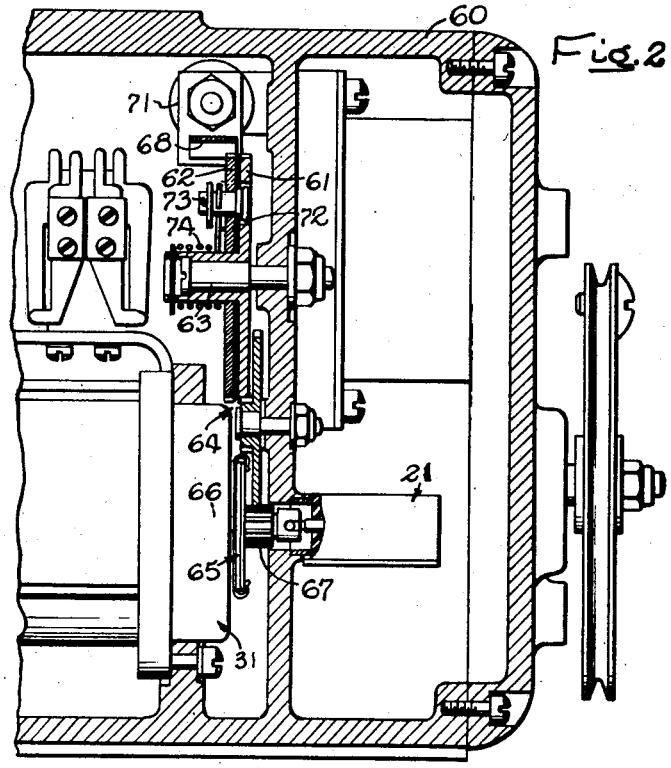
Fig. 2 is a vertical sectional view of the principal parts of the range limiting means.

It will be observed from the foregoing that except for the generators 34 all of the parts of the automatic synchronizing control and the manually controllable speed adjusters up to and including the transmitters 21 and 41 may be located at a point of control, such as the pilot station in an airplane, which is remote from the engines M and S or any additional slave engines which may also be controlled. All of these parts are housed in a casing 60 (Fig. 2) along with the parts, that is the differential motor 31, the commutator switch 21, and the relay 37, which would be duplicated for each additional slave engine S to be synchronized with the master. The step motors 18 for such additional engines would be adapted for energization from the common switch 41 during manual adjustment of the speed settings or by their own commutator switch 21 during automatic synchronizing.

In accordance with the present invention, means is located at the remote control point which operates to limit to a relatively small part of the speed range the extent to which the speed of the slave engine or engines may be decreased while under the automatic synchronizing control. Thus, if the master engine should slow down or fail, the possibility of the automatic synchronizing control reducing the speeds of the slave engines to an objectionable degree is avoided and optimum safety in the operation of an airplane is thereby assured.

The limiting means above referred to is a range to act positively on the driving connection between each differential motor 31 and the commutator switch 21 driven thereby. It includes relatively rotatable members 61 and 62 having a limited lost motion connection between them. The member 61 is a gear journaled on a shaft 63 in the casing 60 and driven from the differential motor 31 through speed reduction gearing 64. The gear thus turns back and forth at a reduced speed during normal operation of the differential motor to effect speed adjustments of the slave engine S and match its speed against that of the master engine M.

To avoid damage to the differential motor or the associated parts, a slip clutch 65, preferably of the friction type, is interposed between the motor shaft 66 and the drive pinion 67 of the gearing. When the pinion is held against turning, the clutch will slip permitting operation of the differential motor.

The other member 62 of the movement limiting means is a disk journaled on the hub of the gear 61 and releasably held against rotation. This is accomplished by a brake in the form of a pawl 68 pivoted on the casing 60 and constantly urged by a spring 69 against the toothed periphery 70 of the disk, thereby locking the latter positively against turning. The pawl constitutes the armature of an electromagnet 71 which, when energized, withdraws the pawl so as to release the disk 62. For a purpose to appear later, the coil of the magnet is connected in parallel with the relay 37 previously described so as to be energized automatically in response to disabling of the automatic synchronizing control preparatory to readjustment of the engine speeds under the control of the hand lever 51. Conversely, when the manual control is withdrawn and automatic synchronizing restored, the magnet is deenergized and the brake reapplied.

Figure 4:
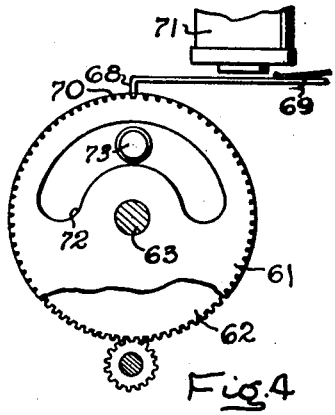
Fig. 4 is a fragmentary elevational view of the parts of the range limiting means.
Figure 3:
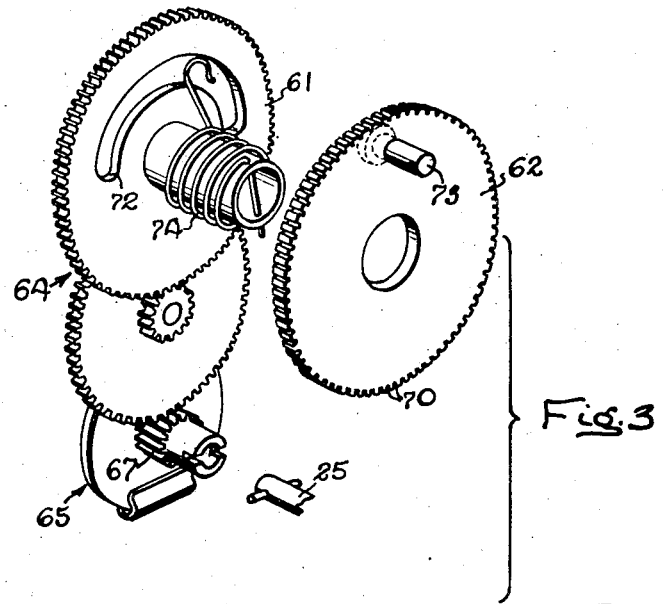
Fig. 3 is a perspective view of the range limiting means.

The lost motion connection between the gear 61 and the disk 62 is formed in the present instance by an arcuate slot 72 in the gear and a pin 73 received in the slot and projecting from the disk 62. The disk and gear are thus adapted to turn relative to each other through a half revolution which, by proper selection of the gearing, corresponds to only a small fraction of the total speed range through which the engines may be adjusted. For example, the lost motion may correspond to 150 R. P. M. so that when the pin 73 is centered in the lost motion slot 72 as shown in Fig. 4, the slave engine speed may be either increased or decreased 75 revolutions before the slack in the lost motion is taken up and further speed adjustment of the slave engine prevented by the positive action of the then locked disk 62.

To equalize the permissible speed adjustment of each slave engine in both directions following each manual readjustment of the engine speed, means is provided for centering the disk 62 relative to the slack in the lost motion connection whenever the disk is released preparatory to making a manual readjustment of the engine speed. This means comprises a torsion spring 74 coiled around and fastened at one end to the hub of the gear 61, the other end being secured to the pin 73. When the pin is centered in the slot 72, the spring will not be stressed. Turning of the gear 61 in either direction away from this centered position stresses the spring so that whenever the magnetic brake is released, the disk 62 will be turned by the spring and centered relative to the gear as shown in Fig. 4.

It will be apparent that the permissible rotation of the commutator switch 21 by the differential motor 31 is limited positively according to the length of the lost motion connection described above. Thus, during operation of the automatic synchronizing control, the slave engine may follow the master only through a comparatively small number of revolutions, for example 75, before the transmitter 21 is disabled by being blocked against further turning. Accordingly, if the master engine M should fail and thereby slow down, the speed of the slave engines would not be reduced to an objectionable degree. Optimum safety is thus achieved in the use of the automatic synchronizing control on multiengine aircraft.

Provision is made for recentering the parts of the range limiting means above described as an incident to each manual speed adjustment so that the limiting means will be conditioned to allow equal speed adjustment of the slave engine in either direction under the ensuing automatic synchronizing control. That is to say, the speed of the slave engine may be increased or decreased by 75 revolutions. In this way, the possibility of the range limiting means interfering with normal operation of the automatic control is minimized, and at the same time, the possibility of the automatic control disabling a slave engine is eliminated.

Such recentering is accomplished by energizing the brake magnets 71 automatically whenever the manually controlled adjusting motor 43 is running, thereby releasing the member, that is the disk 62, which normally limits the range of the synchronized adjustment. When the manual control is withdrawn and automatic synchronizing restored, the magnets are again deenergized and the brake pawls 68 reengaged with teeth on the disk 62 so as to render the range limiting means again operative.

I claim as my invention:

1. For synchronizing two rotary power units, the combination of speed-correcting means adapted to be associated with one of said units, means by which said speed-correcting means may be actuated automatically in accordance with speed deviations between said units including a rotary differential motor, two members one driven by said motor and having a limited lost motion connection with the second member, yieldable means tending to center said second member in the range of the lost motion, braking means for holding said second member releasably against movement, an auxiliary means operable under manual control for effecting separate selective adjustment of said speed-correcting means, and means controlled by said auxiliary means and operable automatically to maintain said brake applied during operation of said speed-correcting means by said automatic means and to hold the brake released during operation of the speed-correcting means under the control of said auxiliary means.

2. For synchronizing two rotary power units, the combination of speed-correcting means adapted to be associated with one of said units, means by which said speed-correcting means may be actuated automatically in accordance with speed deviations between said units including a rotary differential motor, two members one driven by said motor and having a limited lost motion connection with the second member, yieldable means tending to center said second member in the range of the lost motion, braking means for holding said second member releasably against movement, an auxiliary means operable under manual control for effecting separate selective adjustment of said speed-correcting means, and means operable automatically as an incident to operation of said auxiliary means to release said braking means and permit automatic centering of said second member by said yieldable means.

3. For synchronizing two rotary power units, the combination of speed-correcting means adapted to be associated with one of said units, means by which said speed-correcting means may be actuated automatically in accordance with speed deviations between said units two relatively rotatable members one moved in accordance with the automatic adjustments of said speed-correcting means and having a limited lost motion connection with the second member, yieldable means tending to center said second member within the range of the lost motion, electromagnetic braking means for holding said second member releasably against movement, an auxiliary means operable under manual control for effecting separate selective adjustment of said speed-correcting means, and means by which the energization and deenergization of said electromagnetic braking means may be controlled to maintain said brake applied during operation of said speed-correcting means by said automatic means and to hold the brake released during operation of the speed-correcting means under the control of said auxiliary means.

4. In a system for synchronizing two rotary power units, the combination of means for comparing the rotational speeds of said units including a rotary differential motor, speed-correcting means for one of said units having a rotary driven connection with said motor, two rotary members one rotated in unison with said drive connection, an electromagnetic brake operatively associated with the second rotary member and energizable and deenergizable selectively to hold the latter member or to release the member, means providing a lost motion connection between said members permitting of limited relative turning therebetween, and spring means yieldably resisting turning of said second member relative to the first member in either direction away from a position centered within the range of lost motion between said members.

5. In a system for synchronizing two rotary power units, the combination of means for comparing the rotational speeds of said units, including a rotary differential motor, speed-correcting means for one of said units controlled by said comparing means, two rotary members one rotated in unison with said correcting means, a brake operatively associated with the second rotary member and adapted when applied and released to respectively hold the latter member or to release the member, means providing a lost motion connection between said members permitting of limited relative turning therebetween, and means yieldably resisting turning of said second member relative to the first member in either direction away from a position centered within the range of lost motion between said members.

6. In a system for synchronizing two rotary power units, the combination of means for comparing the rotational speeds of said elements including a rotary differential motor, speed-correcting means having a rotary drive connection with said motor, means associated with said connection and positively operable to limit the range of operation of the speed-correcting means thereby in opposite directions relative to a predetermined centered relation, means by which said limiting means may be released, and means operable automatically as an incident to such release to center said limiting means and thereby equalize the permissible extent of operation of said motor in either direction.

7. In a system for synchronizing two rotary power units, the combination of means for comparing the rotational speeds of said units including a rotary differential motor, an electrical transmitter, a rotary driving connection between said motor and said transmitter speed-correcting means for one of said units including self-synchronous electrical receiver selectively energized by said transmitter, two rotary members one rotated in unison with said drive connection, means operatively associated with the second rotary member for holding the member against rotation or releasing the member and means providing a lost motion connection between said members permitting of limited relative turning therebetween.

8. In a system for synchronizing two rotary power units, the combination of means for comparing the rotational speeds of said units including a rotary differential motor, an electrical transmitter, a rotary driving connection between said motor and said transmitter, speed-correcting means for one of said units including a self-synchronous electrical receiver selectively energized by said transmitter, and means associated with said driving connection and operable to limit the extent of rotation thereof by said differential motor.

9. In a system for synchronizing two rotary elements, a speed adjuster for one of said elements, a reversible motor actuator therefor, a main rotary electrical transmitter for energizing said motor, a differential electric motor for driving said transmitter, releasable means for limiting the range of rotation of said transmitter in opposite directions by said differential motor, and means operable upon release of said last mentioned means to establish a centered relation between said motor and said transmitter whereby to permit of equal rotation of the transmitter in either direction.

10. In an automatic synchronizing control, the combination of, speed comparing means including a rotary differential motor, speed-correcting means, driven by said motor, two members one driven by said motor and having a limited lost motion connection with the second member, yieldable means tending to turn said second member relative to the first member and establish a predetermined positional relation therebetween, means for holding said second member releasably against movement, and means controlling the release of said last mentioned means.

11. In an automatic synchronizing control, the combination of, speed comparing means, speed-correcting means, having a driving connection therewith so as to be actuated thereby, means associated with said connection for positively limiting the extent of operation of the speed-correcting means, and means by which said limiting means may be rendered operative and inoperative.

JAMES W. DRAKE.